United States Patent [19]

Bluethgen

[11] 4,445,149

[45] Apr. 24, 1984

[54] METHOD FOR THE JOINING, OR MIXING-IN OR FADE-IN OF TWO AUDIO DIGITAL SIGNAL SEGMENTS, FREE OF INTERFERING SIGNALS

[75] Inventor: Bjoern Bluethgen, Celle, Fed. Rep. of Germany

[73] Assignee: Polygram GmbH, Fed. Rep. of Germany

[21] Appl. No.: 127,812

[22] Filed: Mar. 6, 1980

[30] Foreign Application Priority Data

Mar. 29, 1979 [DE] Fed. Rep. of Germany ....... 2912481

[51] Int. Cl.³ .......................... G11B 27/02; G11B 5/00
[52] U.S. Cl. ................................................... 360/13
[58] Field of Search ........................ 360/13, 15, 72, 32; 364/900 MS File

[56] References Cited

U.S. PATENT DOCUMENTS

| | | | |
|---|---|---|---|
| 3,512,146 | 5/1970 | Smith et al. | 340/174.1 |
| 4,067,049 | 1/1978 | Kelly et al. | 360/14 |
| 4,187,544 | 2/1980 | Larner | 364/514 |
| 4,249,218 | 2/1981 | Davis et al. | 360/13 |
| 4,327,382 | 4/1982 | Tanaka | 360/13 |

FOREIGN PATENT DOCUMENTS

| | | |
|---|---|---|
| 1449423 | 7/1969 | Fed. Rep. of Germany . |
| 1499757 | 7/1970 | Fed. Rep. of Germany . |
| 2810984 | 9/1978 | Fed. Rep. of Germany . |
| 2710781 | 9/1978 | Fed. Rep. of Germany . |
| 2916973 | 10/1979 | Fed. Rep. of Germany . |
| 2339306 | 8/1977 | France . |

OTHER PUBLICATIONS

Trissl, "Der Schneidetisch mit Zeitcodesteuerung", Rundfunktechn. MiHeilungen, 1976, vol. 20, No. 5, pp. 203-210.
Diermann, "Digital Videotape Recording: An Analysis of Choices", SMPTE Journal, 1978, vol. 87, pp. 375-378.
Silvie et al., "Automatisches Elektronisches Schneiden von Videobändern", Radio Mentor Electronic, 1970, vol. 36, No. 5, pp. 319-320.
McCracken, John A., "A High Performance Digital Audio Recorder", AES 58th Convention, N.Y., Nov. 4-7, 1977.
Bellis, F. A., "An Error Correcting System for a Multichannel Digital Audio Recorder", AES 58th Convention, N.Y., Nov. 4-7, 1977.
Tsuchiya, C. Yoshikazu, "A 24-Channel Stationary-Head Digital Audio Recorder", AES 61st Convention, N.Y., Nov. 3-6, 1978.
"Electronic Editing of Digital Audio Programs" by Donald Davis & Robert Youngquist, Int. Conference on Video and Data Recording, Southampton, England, Jul. 24-27, 1979, pp. 385-394, S-03400082.

Primary Examiner—Gareth D. Shaw
Assistant Examiner—Daniel K. Dorsey

[57] ABSTRACT

A method is disclosed for the joining or mixing-in or fading of two program segments which appear in the form of digital pulse sequences, free of interfering signals, particularly audio signals digitally stored on magnetic tape, whereby code word sequences which are present in both signal segments in the region of an editing location or fading location are scanned, together with their associated time codes, and are fed to respective intermediate memories. Then, by an acoustically-monitored cyclical circulation of the contents of the intermediate memories, controlled in frequency and direction, an editing location of comparable information for each program segment is determined which is free of interfering signals. A transition, controlled by the time codes is then occasioned from the first signal segment to the second signal segment or a fading of the second signal segment is occasioned relative to the first signal segment. The two time codes which are associated with the editing locations are read for carrying out a mechanical and/or electrical connection of two signal program segments which are acoustically free of interfering signals at the proper time corresponding to a common edit point identified by the two time codes.

5 Claims, 2 Drawing Figures

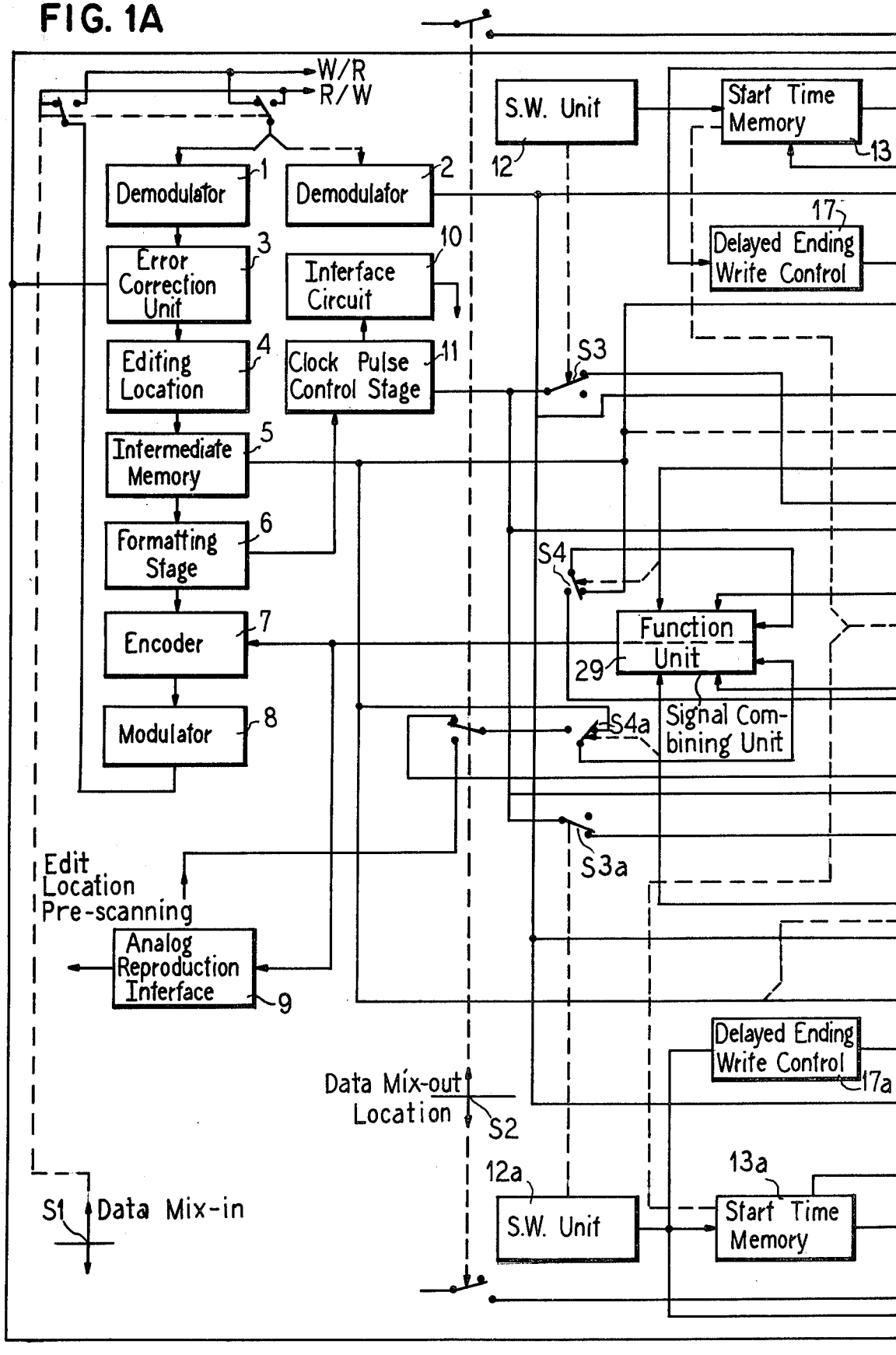

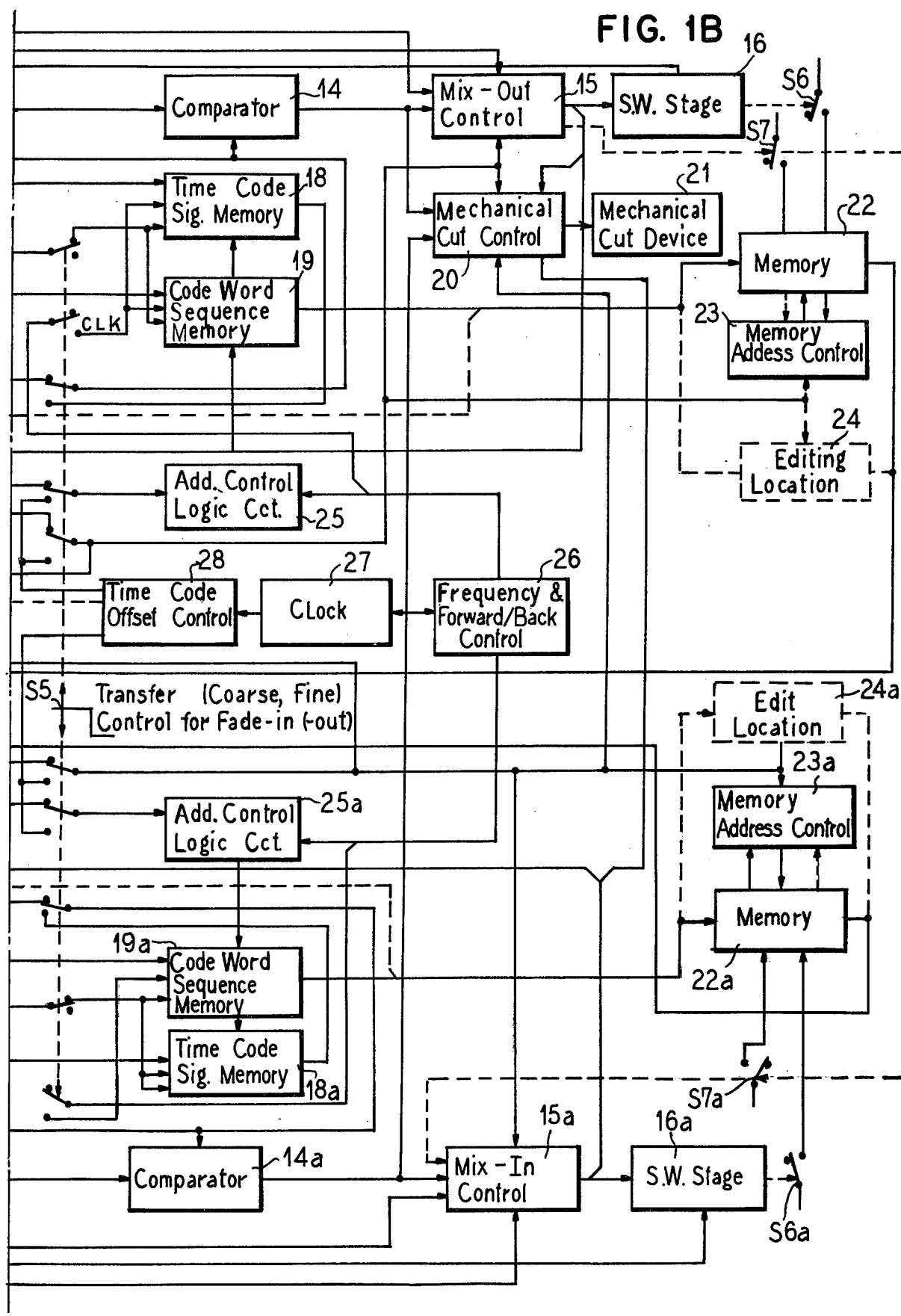

METHOD FOR THE JOINING, OR MIXING-IN OR FADE-IN OF TWO AUDIO DIGITAL SIGNAL SEGMENTS, FREE OF INTERFERING SIGNALS

BACKGROUND OF THE INVENTION

1. Field of the Invention

The present invention relates to a method for joining, mixing-in or fading-in two signal segments which occur in the form of digital code word sequences, in particular of digitally coded audio signals free of interfering signals, with the use of signal scanning devices, i.e. reading devices, which are employed for determining an edit or fade-in location.

2. Description of the Prior Art

With audio signals which are stored digitally on a magnetic tape in accordance with the standards of the Audio Engineering Society, a problem exists in that the joining of two program segments cannot be easily accomplished free of interfering signals as in the same manner as has been customary with analog techniques. A difficulty arises in that the data blocks of the two program segments which are stored on separate tapes along with associated time codes, and error correction and parity bits, cannot be coupled with one another randomly, but only synchronously corresponding to a predetermined data block format. Also, a difficulty arises in editing digitally coded audio signals carried in magnetic tape in that the connection of two abruptly interrupted acoustic signal sequences is acoustically inadequate or impossible at every random location.

According to the prior art of audio signal recording, an "edit" which is free of interfering signals can be carried out if the edit location is followed by at least a several millisecond program pause. In order to determine a suitable edit location at the end of one program segment and at the beginning of another program segment to be coupled thereto, instantaneous values of the same level are sought in both program segments with the help of a display unit. Thereafter, the signal segments are connected with one another. The acoustic engineering processing of digitally-recorded programs, therefore, is made much more difficult than the processing of analog-recorded programs because of the lack of the customary "scissor diagonal cut" (a matching of analog signals) with the fade-in of two program segments so that the fade-in is free of interfering signals. This is also true because of the limitation of a skip-free location (matched signal levels) or program-free location (audio pause) and also because of the complicated determination of the optimum editing point through the use of a special display unit.

SUMMARY OF THE INVENTION

The object of the present invention, therefore, is to provide a new and improved editing process for acoustic engineering processing of digital audio signal programs.

According to the invention, the above object is achieved by reading two program segments from respective tapes, together with the time codes associated therewith and also stored on the same tapes, and storing the information read as binary-coded code word sequences, hereinafter simply "code word sequences" in respective memories. The contents of the memories are circulated, with the circulation of each being controlled in frequency and direction, while being read and acoustically monitored until an edit location free of interfering signals is determined. When such a location is determined, a transition is made under the control of the time codes from the first signal segment to the second signal segment, or a fade-in of the second signal segment onto the first signal segment is performed.

Advantageously, the code word sequences stored in the intermediate memory associated with the first signal segment and occurring before and after only a narrow region of a determined edit location or fade-in location, identified by their associated time code, are transferred to an editing location of a third memory having a relatively smaller capacity. Thereafter, the same information of the second signal segment occurring in a narrow region before and after the determined edit location or fade-in location, and identified by its associated time code, is transferred into a fourth memory. Finally, after the editing process and by way of a mechanical cut, or, in the case of fading, a copying process onto a further signal carrier, the code word sequences of the first and second segments are read from the third and fourth memories and are joined together at the edit location identified by the two time codes.

It is also advantageous that the code word sequences of the program segments are read from the third and fourth memories together with the time codes associated therewith and are stored, for safety purposes, in free memory locations within a data carrier which stores the two program segments.

BRIEF DESCRIPTION OF THE DRAWING

Other objects, features and advantages of the invention, its organization, construction and operation will be best understood from the following detailed description, taken in conjunction with the accompanying drawing, on which FIGS. 1A and 1B together form a schematic diagram of apparatus for practicing the invention.

DESCRIPTION OF THE PREFERRED EMBODIMENTS

Referring to FIGS. 1A and 1B, a combinational logic circuit for the execution of fading-in, or mixing-in and mixing-out processes is illustrated for connecting two acoustic signal program segments. The code word sequences of one segment, including the digitally-coded audio information, error correction codes, parity bits, and the associated time code, are read in the region of the edit location by way of a read-write head and the digitally-coded audio signal is fed by way of a switch S1 (left switch position) to a demodulator stage 1 for conversion of the data signals into code word sequences representing the audio information and the error correction information, while a demodulator stage 2 extracts the time codes associated with the audio information. The code word sequences are now fed to an error correction unit 3 for identification and error correction of incorrectly-transmitted acoustic signal data and for the derivation of an indicator signal for that time period in which a data correction by way of redundant signal data is insufficient. Next, the corrected code word sequences are fed to an edit location for the output thereof for storage and for acoustic monitoring. These are the words with which the first program segment is compared with similar data of the second program segment; therefore, this information is fed to an intermediate memory 5 for time equalization of the physical spacing difference between a scanning or reading unit and a writing unit for the synchronous data mixing or fading.

Finally, the data signals of the code word sequences are transmitted from the intermediate memory 5 into a memory 19 which stores the same as representing the first program segment, advancing and tracking in time in accordance with the associated time codes. These code word sequences surround or cover an edit or fade-in location, which location will be accurately defined by cyclical repetition of the circulating memories and by conversion and acoustic monitoring of the same over an acoustic path, as set forth hereinbelow. Simultaneously with the demodulation and storage set forth above relating to the audio information, the time code signals associated with the audio data signals which become the code word sequences, are supplied by the demodulator stage 2 to a time code signal memory 18. By way of a switching unit 12, which is designed for example as a push button, a time code is written into a memory 13, the time code determining the starting time point of a "mix-out process". This is a continually running write-in process and is terminated in a memory of approximately 5 sec capacity by way of a function unit 17 which controls the delayed ending of the signal data write-in process after storage of the data in memories of a further data set corresponding, for example, to half this memory capacity, or approximately 2.5 sec. In parallel with the writing process into the memory 19, the switching unit 12, by way of a switching stage 16 for controlling writing-in and reading-out of data for signal fade-in or fade-out, and by way of a switch S6, starts the writing of the code word sequences into a memory 22. This operation covers a time interval of approximately 20 msec, which is necessary for fading-in or mixing-in of two program segments free of interfering signals, so that the memory 22 is only required to accept a relatively small amount of data.

The function or control units, the memories and the switches which are responsible for the processing of the second program segment are illustrated on the drawing with the same reference characters as similar elements for the first program segment and are further provided with a lower case "a". The memory 19a thus stores the code word sequences of the second segment and feeds the same to the memory 22a, while the time code signal memory 18a stores the associated time codes.

The determination of an edit location or fade-in location which is free of interfering signals takes place by cyclically reading the code word sequence stored in the two data memories 19 and 19a. This process is brought about by a reversal of the switch S5 to activate the address control logic circuits 25, 25a which are responsible for the intermediate memories 18, 18a, 19, 19a, a clock pulse generator 27, a manually-controlled unit 26 for controlling the frequency of the clock pulse generator and the forward/backward cycling of the memories during cyclic reading, and a further unit 28 for manually changing the time codes or time values in the same direction or in the opposite direction. With the control unit 28, the time values can be changed or offset manually with respect to one another or made to coincide with one another. These time values, in the case of cyclically-controlled repetitive reading of the memory contents of the two memories 19, 19a with their associated time codes from the memories 18, 18a, determine the starting time points in the starting time memories 13, 13a under the control of the respective mix control units 15, 15a.

Further, by way of the mix control units 15, 15a, a signal joining unit 29 is controlled in such a manner as to cause a mathematical joining of the code word sequence of the first and second program segments. The joined code word sequences are fed to an encoder 7 for data block formatting and to an edit location 9 for coupling-out of the binary-coded acoustic signal data for the purpose of an analog playback. The mathematical connecting of the code word sequences in a fade-in region is activated by a time value coincidence of the outputs of the memories 13, 13a with the outputs of the time code signal memories 18, 18a, by way of respective comparators 14, 14a, under the control of the units 15, 15a. The units 15, 15a are controlled by external operating elements 25, conventionally used in recording studios, to set the time duration of the mixing-out or mixing-in process. Final time values for the beginning of the program fade-in are derived from the time value offset control unit 28 and are stored in the memories 13, 13a, as is the case for the associated code word sequences which are stored in the memories 22 and 22a. A control unit 20 for deriving, from the time codes, the precise point in time for mechanical abrupt signal severance in the middle of the fade-in process, causes the two edit locations of the magnetic tapes to be supplied, one after the other, to a mechanical cut device 21 for the execution of a "mechanical cut". The edit locations are then connected with one another, for example by adhesive tape.

Operation of the switch S5 after moving of the edit location of a tape past a read-write head R/W, causes the data stored in the two memories 22, 22a to be read at the proper time for the duration of the fade-in process. This is controlled over a path which includes the time code demodulator stage 2, the switch 5, the memories 13, 13a, the comparator stages 14, 14a, the units 15, 15a, the switches S7, S7a, the switches S4, S4a and the mathematical coupling unit 29. The scanning by "reading" of the code word sequences and the associated time codes as data blocks by way of the switch S1, the demodulator stage 1, the error correction unit 3, the edit location 4, the data intermediate memory 5, and the data block formatting stage 6, activates a clock pulse control stage 11, the purpose of which is to derive clock pulse signals for the operating and control units from the scanning signal data. These are the control units which take part in the fade-in, mix-in or mix-out processes by way of the switches S3, S3a, S5, the intermediate memory address controls 23, 23a, the clock pulse synchronous reading of the memory contents of the memories 22, 22a, and a continuous data block formatting for the fade-in region and the following program segment. The data blocks which are so coupled with one another are now fed to a modulator 8 which converts the code word sequences into a form corresponding to the data recording process. The output signals of the modulator 8 are fed to a write-read head W/R by way of the switch S1 (right position), and at the proper time are stored into a data carrier.

The combining logic, which is represented on the drawing, can also be used in an advantageous manner for the mixing-out of so-called "drop-outs". In particular, if by way of the error correction unit 3, or a defect in material in the recording unit, an incorrect "drop-out" is signaled to the control units 15, 15a, then a mixing-out or mixing-in of the program segments surrounding an acoustically-weak "drop-out" occurs at the proper time under the control of the units 15, 15a.

In the case of indirect combining of two program segments by intermediate copying thereof onto an additional data carrier, the program segments to be combined, and located for example upon two recording devices, are coupled with one another by way of a time code offset control which is derived from the memories 13, 13a. As described above in conjunction with the embodiments of a mechanical cut, the program segments are combined with one another into a continuous copied program by way of the code comparator stages 14, 14a, the control units 15, 15a, the switches S7, S7a, the memories 22, 22a, the switches S4, S4a and the mathematical coupling control unit 29.

In order to provide "punch-in" of new coded acoustic signal data words provides as code word sequences, by overwriting of the existing digital acoustic signal data as a continuous program sequence, scanning is undertaken to store the new data in the intermediate data memory 5 by way of the demodulator stage 1, error correction unit 3, and the interface or edit location 4. This new data is then fed to the data block format stage at the time of the program fade-in-mix-in and thereafter a continuous data block formatting free of interfering signals is provided by way of the encoder 7.

The first existing code word sequences are supplied from the intermediate data memory 5 by way of the switch S4 to the mathematical joining control unit 29, and the "punched-in" acoustic signal data words are also supplied to the unit 29 as code word sequences by way of the switches S2 and S4a, so that the fade-in or mixing-in is provided under the control of the control units 15, 15a.

SCHEDULE OF COMPONENTS

| | |
|---|---|
| 1 | Demodulator stage for data signals |
| 2 | Demodulator stage for time code signals |
| 3 | Error correction unit for the identification of errors and corrections |
| 4 | Interface for the release of binary-coded acoustic signal data words |
| 5 | Data intermediate memory |
| 6 | Data block formatting stage |
| 7 | Encoder for data block formatting |
| 8 | Modulator stage |
| 9 | Interface for analog reproduction |
| 10 | Interface for synchronous clock pulse control of data words which are to be employed for punch-in |
| 11 | Clock pulse control stage |
| 12 | Switching unit for the writing-in of a starting time value of a mixing-out process |
| 12 (a) | Switching unit for the writing in of a starting time value of a mixing-in process |
| 13 (a) | Memory for the start time values |
| 14 (a) | Comparator for the comparison of the stored time codes |
| 15 (a) | Control unit for the mixing-out or mixing-in process |
| 16 (a) | Switching stage for controlled writing-in and reading-out of data intended for a signal fade-in (out) |
| 17 (a) | Function unit for controlling delayed ending of the signal data writing-in process |
| 18 (a) | Memory for binary-coded time codes |
| 19 (a) | Memory for the data binary-coded acoustic signal data words region of the program editing location |
| 20 | Control unit for deriving of the precise point in time for mechanical abrupt signal severance (tape cut) |
| 21 | Device for the carrying out of the "mechanical cut" |
| 22 (a) | Intermediate memory for binary-coded acoustic signal data words |
| 23 (a) | Intermediate memory for binary-coded acoustic signal data words |
| 24 (a) | Editing location for the storage and/or read-out of the signals stored in the intermediate memory 22(a) |
| 25 (a) | Address control logic for the time value memory or data intermediate memory 19(a)/19(a) |
| 26 | Clock pulse generator frequency and forward/backward control |
| 27 | Clock pulse generator for the cyclic memory read-out |
| 28 | Function unit for manual change of the time codes in the same direction, or in the opposite direction (time offset) |
| 29 | Function unit for the mathematical coupling of the binary-coded acoustic signal data words to be combined with one another |
| W/R | Write/read head |
| R/W | Read/write head |
| S1 | Switch for the editing location scanning and for the recording of the editing location data which are coupled with one another |
| S2 | Switch for the mixing-in (punch-in) of binary-coded data |
| S3 | Switch for the determination of a mix-out starting time |
| S3 (a) | Switch for the determination of a mixing-in starting time |
| S4/S4a | Switch for the read-out at the proper time of the binary-coded acoustic signal data stored in the intermediate memory 22 or 22(a) |
| S5 | Transfer switch for determining an editing location or fade-in (out) location free of interfering signals |
| S6 | Switch for the controlling of the write-in processes of the intermediate memory units 22/23 or 22(a)/23(a) |
| S7 | Switch for the controlling of the reading processes of the Intermediate memory units 22/23 or 22(a)/23(a). |

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly by included within the scope of my contribution to the art.

I claim:

1. In a method for the joining, mixing-in, fading-in and fading-out of first and second audio program segments which are stored on respective magnetic tape sections as digitally coded audio signals including error correction codes, along with assigned time codes, in which the digitally coded audio sequences and time codes are read and monitored to determine interference-free locations which may be joined as a single edit location, the improvement therein comprising the steps of:

reading each of the digitally coded audio signals and the assigned time codes of the first and second audio program segments from the respective magnetic tape sections;

converting the digitally coded audio signals of the first audio program signal segment into first code word sequenced and storing the same along with the assigned time codes;

converting the digitally coded audio signal of the second audio program signal segment into second code word sequence and storing the same along with their associated time codes;

circulating the stored first and second code word sequences, along with their time codes, relative to one another while monitoring the same by reading and converting the same into audio signals, until an interference-free location of comparable program is determined for each of the audio program segments; and joining the second code word sequence to the first code word sequence at a common edit location identified by the respective time codes of the interference-free locations.

2. The improved method of claim 1 wherein the step of circulating is further defined as:
   circulating the stored first and second code word sequences at different frequencies.

3. The improved method of claim 1, wherein the step of circulating is further defined as:
   circulating the stored first and second code word sequences selectively at different frequencies and selectively in first and second directions.

4. The improved method of claim 1, wherein the step of joining the first and second code word sequences is further defined as:
   cutting each of the magnetic tape sections at the respective interference-free locations identified by the respective associated time codes; and
   attaching the two tape sections together at the common edit location.

5. The improved method of claim 4, wherein the step of attaching is further defined as:
   taping the magnetic tape sections together.

* * * * *